(12) United States Patent
Ruffa

(10) Patent No.: US 7,985,924 B1
(45) Date of Patent: Jul. 26, 2011

(54) COAXIAL TRANSDUCER

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 398 days.

(21) Appl. No.: 12/287,154

(22) Filed: Sep. 29, 2008

(51) Int. Cl.
*H01B 7/00* (2006.01)

(52) U.S. Cl. ............... 174/102 R; 174/113 R; 174/36

(58) Field of Classification Search .......... 174/110 R, 174/113 R, 115, 116, 36; 385/101, 104, 385/107
See application file for complete search history.

(56) References Cited

U.S. PATENT DOCUMENTS

| | | | | |
|---|---|---|---|---|
| 4,156,104 A | * | 5/1979 | Mondello | 174/70 R |
| 4,695,127 A | * | 9/1987 | Ohlhaber et al. | 385/101 |
| 4,867,527 A | * | 9/1989 | Dotti et al. | 385/101 |
| 4,952,012 A | * | 8/1990 | Stamnitz | 385/101 |
| 5,042,903 A | * | 8/1991 | Jakubowski | 385/101 |
| 5,468,913 A | * | 11/1995 | Seaman et al. | 174/102 R |
| 5,555,336 A | * | 9/1996 | Winslow | 385/101 |
| 5,745,627 A | * | 4/1998 | Arroyo et al. | 385/101 |
| 6,195,487 B1 | * | 2/2001 | Anderson et al. | 385/101 |

* cited by examiner

*Primary Examiner* — William H Mayo, III
(74) *Attorney, Agent, or Firm* — James M. Kasischke; Jean-Paul A. Nasser; Michael P. Stanley

(57) ABSTRACT

A coaxial transducer that uses lead zirconate titanate ceramic or other suitable material as an isolator between the conductors in a coaxial cable to transmit acoustic power at useful levels. The lead zirconate titanate ceramic is diced into thin disks and placed in between spacers made of much stronger insulating material. The coaxial cable is then integrated into a conventional double-armored steel tow cable with a typical diameter of 1". This provides substantial longitudinal strength and provides crushing resistance to the lead zirconate titanate ceramic when the cable is being deployed or retrieved over a sheave under tension.

1 Claim, 1 Drawing Sheet

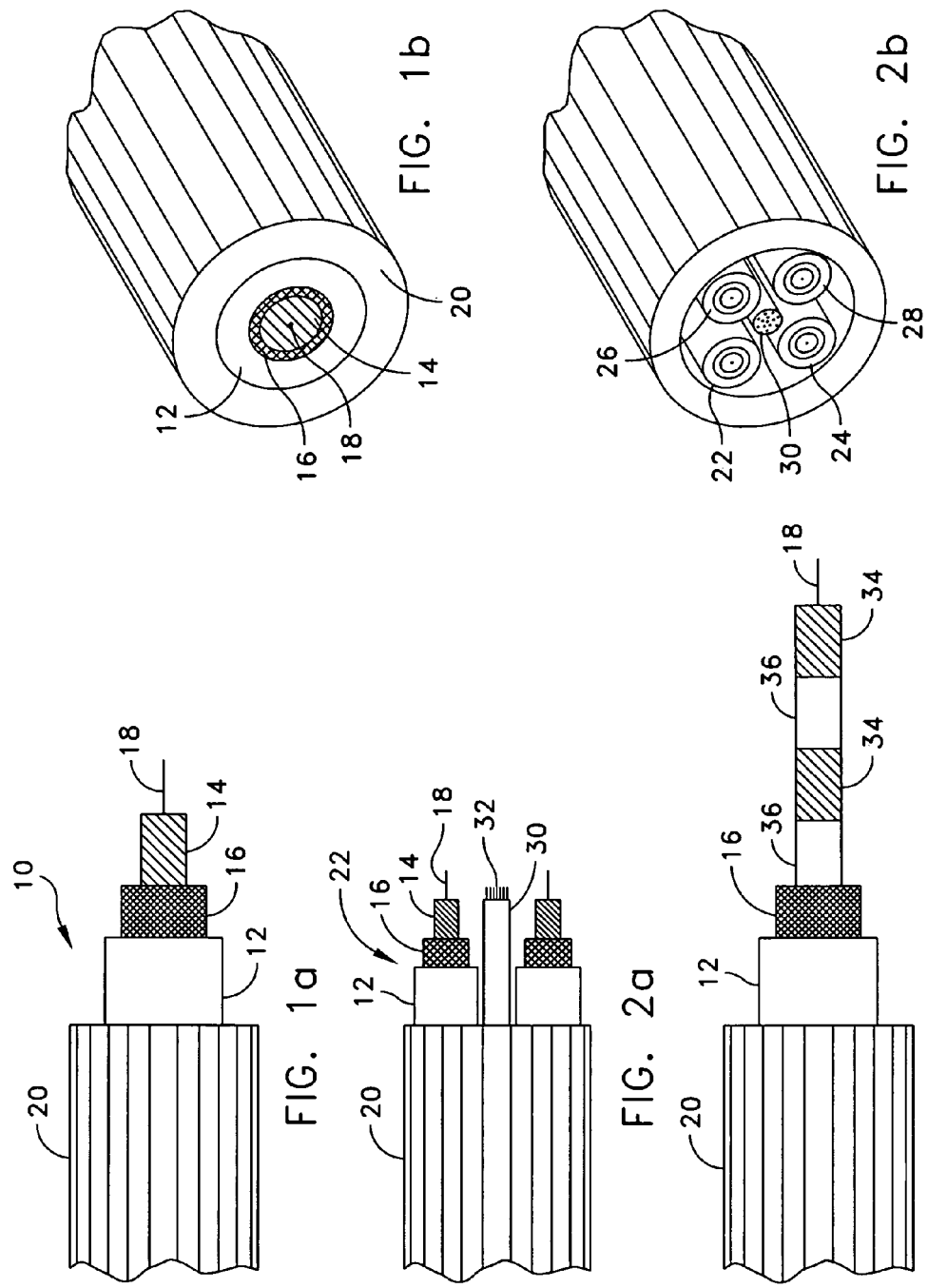

COAXIAL TRANSDUCER

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention is directed to tow cables for use with surface ships and underwater vehicles. In particular, the present invention is directed to integrating transduction material into the coaxial cable component of a tow cable for use as an acoustic transducer, taking advantage of the cable's long length to achieve significant acoustic source level.

(2) Description of the Prior Art

Surface ships and underwater vehicles often use tow cables while towing arrays of equipment such as hydrophones. Coaxial cables are commonly integrated into tow cables to transmit power and data to the tow body. Prior art tow cables and tow bodies adapted for use with ships and underwater vehicles require a large handling system, a dedicated room, and a stern door. Mechanical problems plague the deployment and retrieval efforts. Furthermore, a heavy tow body leads to a steep critical angle for the tow cable, requiring fairing and a specialized winch with multiple drums. The winch (and foundation) rating must exceed the cable breaking strength for safety. In light of some of the implementation problems described above, several "soft tow" concepts have been proposed, replacing an acoustic source in a tow body with a distributed acoustic source in a towed hose wound directly on a winch in an attempt to reduce handling complexity and increase vertical aperture. An acoustic source integrated into the tow cable will impact the handling system minimally. Currently, there is a need for a new type of acoustic transduction device, one integrated directly into a tow cable by replacing the insulating spacer in a coaxial cable with transduction material for use in an armored tow cable, or a dipping sonar cable.

SUMMARY OF THE INVENTION

It is a general purpose and object of the present invention to implement an acoustic transduction device integrated directly into a coaxial cable taking advantage of its long length to achieve significant acoustic source level.

It is a further purpose and object of the present invention to integrating an acoustic source directly into a 1" diameter double-armored steel tow cable instead of a much larger hose.

It is a further purpose and object of the present invention to transmit significant acoustic power with a tow cable.

The above objects are accomplished with the present invention through the use of lead zirconate titanate ceramic or other suitable transduction material as the isolator between the conductors in a coaxial cable to transmit acoustic power at useful levels. The lead zirconate titanate ceramic is diced into thin disks, poled in the radial direction, and placed in between spacers made of much stronger insulating material. The coaxial cable is then integrated into a conventional double-armored steel tow cable with a typical diameter of 1". This design provides substantial longitudinal strength and provides crushing resistance to the lead zirconate titanate ceramic when the cable is being deployed or retrieved over a sheave under tension.

BRIEF DESCRIPTION OF THE DRAWINGS

A more complete understanding of the invention and many of the attendant advantages thereto will be more readily appreciated by referring to the following detailed description when considered in conjunction with the accompanying drawings, wherein like reference numerals refer to like parts and wherein:

FIG. 1a illustrates a side view of one embodiment of the coaxial transducer with exposed components;

FIG. 1b illustrates a cross sectional view of the one embodiment of the coaxial transducer;

FIG. 2a illustrates a side view of a second embodiment of the coaxial transducer with exposed components;

FIG. 2b illustrates a cross sectional view of the one embodiment of the coaxial transducer; and FIG. 3 illustrates a side view of a third embodiment of the coaxial transducer with exposed components.

DETAILED DESCRIPTION OF THE INVENTION

Referring to FIGS. 1a and 1b, in the present invention, a coaxial cable 10 with a plastic jacket 12 is used as a continuous acoustic line source with acoustic transduction material 14 replacing the insulation between the two conductors, the metal shield 16 and the center core wire 18, in the coaxial cable 10. The combined coaxial cable and transduction material are then integrated into a double-armored steel tow cable 20. The plastic jacket functions as a "water block", keeping seawater from the coaxial cable. Making it thicker or of a more compressible material can further reduce stresses in the transduction sections. Finally, speed limits can reduce cable tension, which also reduce stresses in the transduction sections.

For example, a ¼ diameter coaxial cable 10 filled with acoustic transduction material 14 in a mile long cable will have a volume according to the following equation:

$$\frac{\pi}{4}\left(\frac{1/4}{12}\right)^2 \times 5280 = 1.80 \text{ ft}^3. \qquad (1)$$

Since the acoustic source level is usually proportional to the acoustic transduction material 14 volume/weight, a coaxial cable 10 with this design has the potential to generate more acoustic power than sources typically used in traditional prior art tow bodies.

Referring to FIGS. 2a and 2b, in an alternative embodiment of the present invention, four ⅛" coaxial cables 22, 24, 26, and 28 around a center stainless steel tube 30 containing optical fibers 32 integrated into a double-armored steel tow cable 20 provide the same volume of acoustic transduction material as a single ¼" coaxial cable 10, and provide a more rugged design. Although in theory, four ⅛" transducers might allow transmission of a dipole or quadrupole pattern, in practice that does not occur for the following reasons: (1) the coaxial cables 22, 24, 26 and 28 are often helixed inside the tow cable 20; and (2) even if they are not, the tow cable 20 itself twists since it is not perfectly torque balanced. Transmitting through a double-armored steel tow cable 20 will not lead to significant attenuation when the acoustic wavelengths are much longer than the cable diameter.

Referring to FIG. 3, in a further embodiment of the present invention, the acoustic transduction material 14 is composed of a lead zirconate titanate ceramic 34, which leads to a heavier tow cable 20 and increased depth. The lead zirconate titanate ceramic material 34 is diced into thin disks and placed in between spacers 36 made of much stronger insulating material. The lead zirconate titanate density of 7500 kg/m$^3$ leads to 839 lb of total weight. The winch and sheave radii requirements are usually thirty times the cable radius to extend cable life. This minimizes damage to the lead zirconate titanate material. To further reduce stresses on the transducer sections, the winch diameter can be increased, e.g., to 40 times the cable diameter.

A lead zirconate titanate filled coaxial cable is not as fragile as other components integrated into tow cables (e.g., stainless steel tubes filled with gel and optical fibers) and should be capable of surviving under typical conditions as long as the minimum cable bend radius is not violated.

Construction of the transducers for the coaxial cable involves the following steps: A series of ¼" or ⅛" cylinders of transduction material are made with holes for the center conductor. These cylinders are then manufactured into a single coaxial cable, poled in the radial direction, and integrated into the tow cable. To reduce bending stresses (and for ease of manufacture) the transduction material is segmented before integrating it into a coaxial cable. Non-conducting spacers in between the transduction material sections provide design flexibility to increase fracture toughness.

In operation, the long aperture (up to 1 mile) of the coaxial transducer steered to the broadside direction leads to very narrow transmit beams. The coaxial transducer cable is towed, or it is deployed from a stationary ship, helicopter, or underwater vehicle. In the latter case, it would provide significant source level and a very narrow vertical beam, which would be virtually impossible to generate from any other deployable system. A mile long tow cable acts as a giant side scan sonar, illuminating both sides of a vehicle with as small as 0.02 degree beams, depending on what the ocean environment can support.

The advantages of the present invention are as follows: The present invention provides a high source level. A mile long cable leads to a transduction volume of 1.80 ft$^3$ within a ¼" coax. Even a much shorter, cable should still lead to high volumes. The present invention has narrow broadside beam. This is especially significant for a "dipping" source deployed from a stationary underwater vehicle. The vertical cable will generate a very narrow vertical broadside beam (less than 1 degree, depending on frequency). The present invention offers ease of handling. Since the transduction material is integrated into a 1" diameter cable, it can be deployed from a small winch. The present invention does not cause cavitation. The sound pressure level per foot is low—below the threshold for cavitation.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A coaxial transducer for use in a tow cable comprising:
    a center stainless steel tube containing a plurality of optical fibers;
    a plurality of coaxial cables surrounding said center stainless steel tube wherein each coaxial cable comprises:
        a center core conductor wire;
        a cylindrical jacket of acoustic transducer material surrounding said center core conductor wire;
        a cylindrical metal shield conductor surrounding said cylindrical jacket of acoustic transducer material;
        a cylindrical jacket of plastic surrounding said cylindrical metal shield conductor wherein said cylindrical jacket of plastic serves as a water tight protective covering; and
    an armored steel tow cable surrounding said cylindrical jacket of plastic.

* * * * *